June 2, 1936. G. S. WITHAM, JR Re. 19,997
FREENESS INDICATOR AND RECORDER
Original Filed June 28, 1932 3 Sheets-Sheet 1
FIG. I.
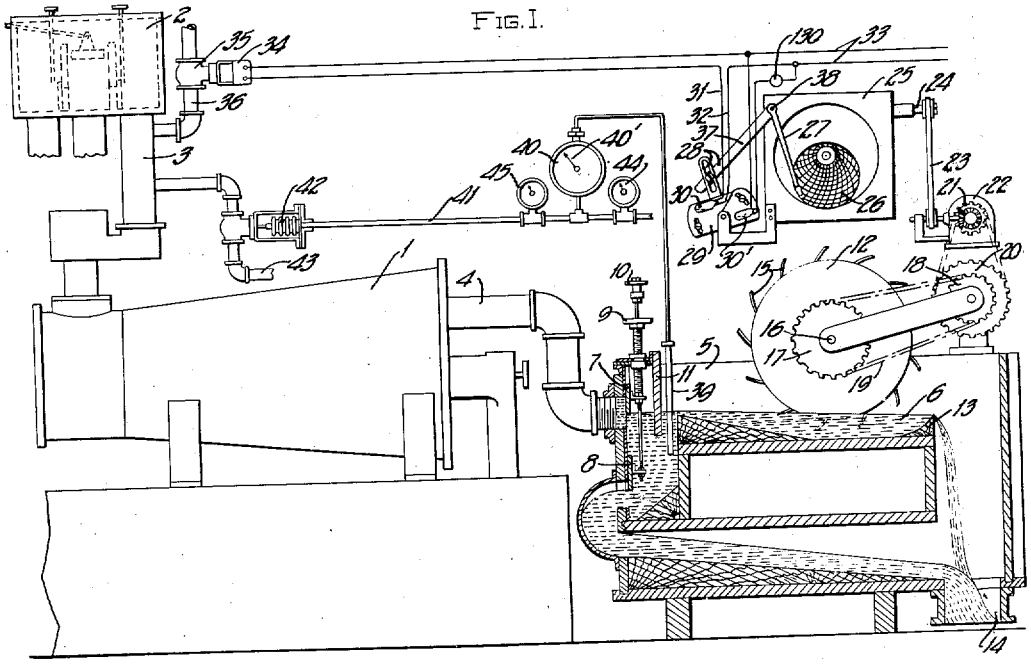
FIG. 2.
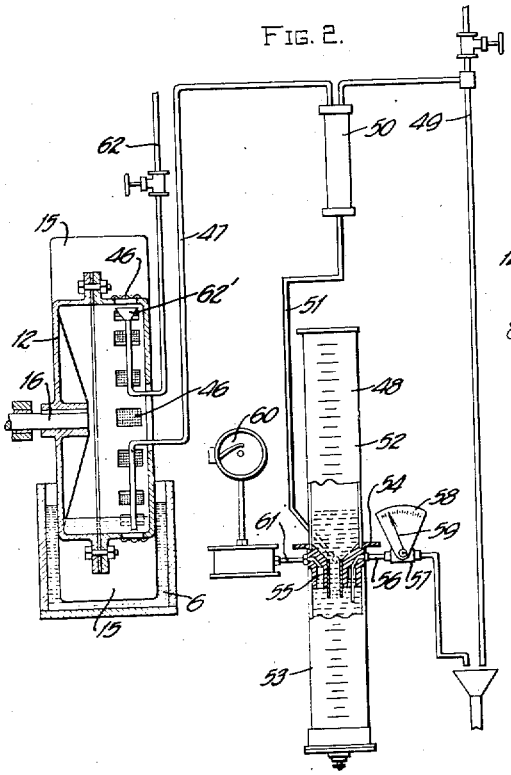
FIG. 3.
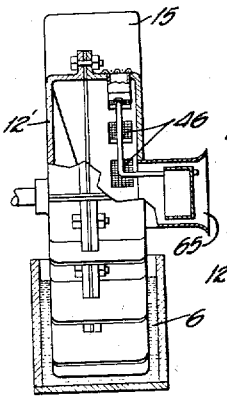
FIG. 4.
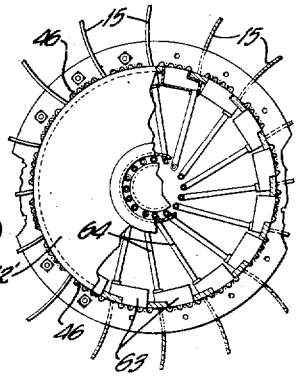
INVENTOR:
GEORGE S. WITHAM JR.,
BY Andrew Wood
HIS ATTORNEYS June 2, 1936. G. S. WITHAM, JR Re. 19,997

FREENESS INDICATOR AND RECORDER

Original Filed June 28, 1932 3 Sheets-Sheet 2

INVENTOR:
GEORGE S. WITHAM JR.
BY Andrews & Wood
HIS ATTORNEYS

June 2, 1936. G. S. WITHAM, JR Re. 19,997

FREENESS INDICATOR AND RECORDER

Original Filed June 28, 1932 3 Sheets-Sheet 3

INVENTOR:
GEORGE S. WITHAM JR.
by Andrew Wood
HIS ATTORNEYS.

Reissued June 2, 1936

Re. 19,997

UNITED STATES PATENT OFFICE 19,997

FREENESS INDICATOR AND RECORDER

George S. Witham, Jr., Lincoln, N. H.

Original No. 1,945,988, dated February 6, 1934, Serial No. 619,729, June 28, 1932. Application for reissue August 24, 1934, Serial No. 741,345

6 Claims. (Cl. 92—38)

One of the difficult problems in the manufacture of paper, which is a more or less continuous operation, is to produce a product having uniform characteristics throughout such as Mullen tear, opaqueness, texture, bulk, etc. Likewise, the making of a paper to a definite specification or in which the characteristics of a given sample will be duplicated presents considerable difficulty. Paper is made from fluent materials and the characteristics of these materials determine the characteristics of the finished paper.

In my copending application Ser. No. 537,342 I have disclosed methods and apparatus for determining, recording and controlling the density, consistency or specific gravity of fluent paper stock. While a means for maintaining a uniform consistency of the fluent materials is a very important factor in producing paper to a definite specification, it is recognized that stock of uniform freeness is also necessary to produce consistently a uniform product.

If there is very much coarse fiber and insufficient filler (fine, fluffy fiber) in the stock, the floer mat will not pack well, it will be of open texture, and the water will pass through quickly. Such a stock is called "free stock". On the other hand, if there is a large amount of fiber mixed with fiber having frayed out ends, a denser mat will be made. The water will then pass through the mat more slowly and the mixture will be known as slow "stock". The rate of drainage of water through the fiber mat is a valuable indication of the quality of the pulp mixture, and the uniformity, strength and finish of the paper are largely dependent thereon.

The freeness of the stock also affords an indication of the character of the treatment that the stock has received in the beater and particularly during the initial treatment therein. If, for example, the roll be put down sharply on the plate at the beginning of the operation, the fibers may retain their length but they will be considerably weakened and the paper will have a raw, soft finish which is due to the overfree stock or stuff. On the other hand where a large proportion of ground wood is incorporated in the stock, the fibers of which reduce very quickly in the beater, the stock soon arrives at the state known as "slow stuff" which results in a poor quality of paper and seriously cuts down the production of the paper machine.

The primary object of my invention is to provide a means which will continuously indicate the freeness of paper stock undergoing preparation. Since the "indicated" freeness of any stock varies with its density and temperature, another object of my invention is to provide an appropriate means for regulating or automatically controlling the density and temperature of the stock whereby is obviated the necessity of correcting the freeness indicated for temperature and density.

My invention, therefore, includes the method of procedure and the novel elements, combinations and arrangements thereof described below and illustrated in the accompanying drawings in which—

Fig. 1 is a general elevation view, partially in section, showing the application of my device to a jordan;

Fig. 2 is an elevation view, partially in section, showing details of apparatus used in connection with my device;

Fig. 3 is an elevation view, partially in section, of a modified form of rotating element which I may employ in determining the freeness of the stock;

Fig. 4 is a side elevational view, partially in section, of Fig. 3;

Figure 5:
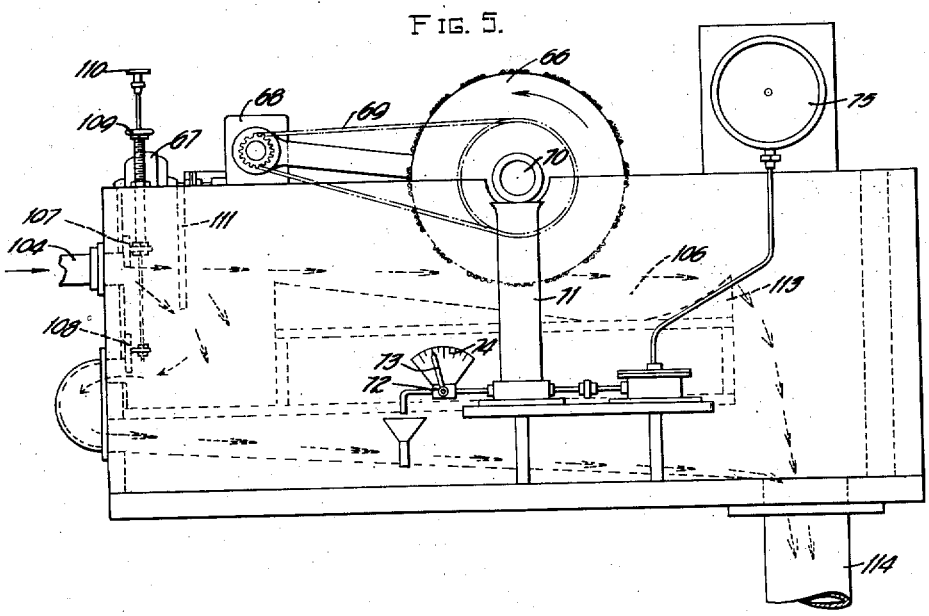
Fig. 5 is a side elevation similar to Fig. 1 but showing a modified form of apparatus.

Referring particularly to Figs. 1, 2, 3, and 4 of the drawings which show the general assembly with details of one modification of my invention as applied to a jordan, 1 represents the jordan which is supplied with material from the head box 2 through the pipe 3. While a head box is not absolutely necessary it is highly desirable inasmuch as it maintains a uniform head of material on the jordan. The treated material delivered from the jordan flows through the pipe 4 into the tank or vat 5. This vat is provided with a channel 6 which may be about the width shown in Figs. 2 and 3. Only a portion of the material delivered from the jordan is diverted through the channel 6 and the volume delivered is controlled by means of gate valves 7 and 8 which are separably operable through the hand wheels 9 and 10 respectively. The gate valve 7 controls the flow from the jordan into the vat 5 while the valve 8 controls the outflow of material from the vat. It is obvious that by adjusting the relative sizes of the openings through the valves 7 and 8 that the depth or volume of the material diverted through the channel 6 may be varied and maintained at will. To prevent any direct flow from the jordan through the diversion channel, a baffle 11 may be provided in front of the opening from the jordan. Since, as will appear later, it is necessary that the rotating element 12 have its lower periphery submerged in the stock flowing through the diversion channel, this channel is provided at its lower end with a dam 13 over which the diverted material flows to join the main body of material passing out through the discharge 14.

The rotating element 12 is quite similar to the rotating element disclosed in my copending application Ser. No. 537,342 for controlling the consistency of the stock in that it is provided about its periphery with paddles or blades 15 which cause it to function very much like an under shot water wheel. That is to say, the stock flowing through the diversion channel 6 causes the wheel 12 to rotate.

Since the rate of flow of stock through the diversion channel depends upon the consistency of the stock, it is quite evident that the rate of rotation of the wheel will be inversely proportional to the consistency. In other words, when the consistency is high the flow of stock through the diversion channel is slow and the wheel 12 rotates slowly. When the density or consistency is low, the volume of stock flowing through the channel is increased, it flows faster under the same head and thereby drives the wheel 12 at a higher rate of speed. This variation in the rate of speed of rotation of the wheel 12 is utilized to control the consistency either by means of the apparatus shown in my copending application or by that which will now be described.

Secured to the shaft 16 upon which the rotating element 12 is mounted is a sprocket wheel 17 driving a smaller sprocket 18 through chain 19. The sprocket 18 is secured to the same shaft as sprocket 20 which drives a sprocket 21 associated with a speed increasing or step-up gear device 22. This device, by means of the belt 23 turns the shaft 24 of a tachometer 25. The tachometer is preferably of the recording type and provided with a clock driven dial 26 calibrated in consistencies and upon which the consistency is recorded.

Connected with a stylus 27 by means of a link mechanism 28 is a mercury switch 29, which may be of the type commercially known as a Mercoid switch. In the position shown in the drawings, the mercury is in the lower end of the tube 30 and is "off contact". When the stylus moves in toward the center of the chart 26, which occurs when the consistency increases and the speed of the tachometer is therefore reduced, the mercury switch is tilted by means of the link mechanism 28, and the wires 31 and 32 are electrically connected to form a circuit through the busses 33 and the solenoid switch 34 which actuates a valve 35 to admit diluent through the pipe 36. A second mercury switch 30' may be used to light a telltale lamp 130; thus providing a visible indication that valve 35 is open.

The lever 37 of the link mechanism 28 may be adjustably secured to the shaft 38 of the stylus 27 so that the mercury switch may be tilted to actuate the diluent valve at any position of the stylus. By this means the consistency of the material is maintained substantially constant.

Since the "indicated" freeness of the stock varies with the temperature, it is extremely desirable that some means be provided for maintaining the temperature of the material substantially constant. This result is attained by means of the following mechanism. 39 is the heat sensitive element of a thermometric device and is immersed in the stock near the diversion channel. This heat sensitive device is associated with a single type regulator 40 which serves to admit air to the pipe 41 for actuating valve 42. This valve 42 is in a steam line 43 and when actuated admits steam to the stock flowing into the jordan. The gauge 44 shows the air pressure available for actuating the valve 42 and the gauge 45 shows the air pressure on the valve. Regulators of this type are manufactured by a number of companies and are quite well known. The hand 40' of the regulator may be set manually so that the steam valve can be actuated to maintain any desirable temperature.

So far I have described only those devices which maintain the consistency and temperature substantially constant and eliminate the necessity of making corrections for these two factors, in so far as the indicated freeness is concerned.

Referring now more particularly to Fig. 2, 3, and 4, I will explain in detail the method and apparatus for determining, indicating and recording the freeness of the stock. The rotating element 12, in addition to having paddles 15 about its periphery, is also provided with a plurality of equally spaced screened openings 46. When the lower periphery of the element 12 is submerged in the stock flowing through the diversion channel, these screens will also be submerged and the more fluent material in the stock will pass therethrough. Since the element 12 is rotating at a substantially uniform rate of speed (except for accelerations and decelerations due to variations in consistency), the volume of water which flows through any screen opening during the period of its submergence will be a positive indication of the freeness of the stock. The balance of the apparatus represents a means for determining this volume.

In Fig. 2 I have shown a siphon pipe 47 which sucks up the water and eventually discharges it into the graduated tubular element 48. This siphon is primed or actuated by permitting water to flow downwardly through the pipe 49 which withdraws air from the chamber 50 thereby causing the liquid which flows through the screen to flow upwardly in pipe 47 and downwardly through chamber 50 and pipe 51 into the graduated element 48. This element is preferably made with an upper section 52 and a lower section 53 which are connected together by coupling 54 provided with an annular recess 55 therein opening into the lower section 53. The liquid flowing into the tubular element 48 gradually rises until it reaches the level of the outflow pipe 56 through which it is discharged. The rate of discharge through this pipe can be regulated by means of a valve 57 provided with a dial 58 and hand 59 indicating the extent of the opening thereof. Assuming that the liquid is flowing downwardly through the pipe 51 into the tubular element 48 at a uniform rate, as would be the case with uniform freeness, the valve 57 may be so regulated that the height of the liquid in the upper section 52 can be maintained at any desired level. If the freeness of the stock increases, liquid will flow at a faster rate into the tubular element 48 and the level of liquid therein will rise until the head is sufficient to produce a rate of outflow equal to the inflow.

When the freeness of the stock decreases the reverse will occur. By graduating the upper portion of the tubular element 48 and calibrating these graduations with known freeness, it is possible to read therefrom at any time the freeness of the material going through.

The tubular element 48 and the associated parts thus constitute a device in which liquid flowing through the filter element accumulates and for indicating variation in the rate of flow of liquid through said element from the normal rate of flow therethrough of liquid from standard stock.

As the liquid rises in the tubular element and passes above the coupling 54, it will be apparent that air will be compressed in the upper portion of the annular recess 55 and that the extent of this compression will depend upon the height of liquid in the upper portion 52 of the tubular element. The degree of compression indicates the level of liquid in the tubular element, and since this level varies with the freeness, the freeness may be indicated by means of a recording level gauge 60 calibrated to freeness and connecting with the annular recess 55 through the pipe 61. The lower portion 53 of the tubular element provides a sump into which will settle heavier particles in the stock. By graduating this portion so that the depth of sediment therein can be measured from time to time a fair indication of the amount of filler etc. passing through the wire will be obtained.

In order that the screens may be freed of any mat or fiber accumulating thereon, I provide an air or a steam pipe 62 having its discharge in nozzle 62' disposed adjacent the inner side of the screen openings at some point of their travel above the surface of the liquid in the diversion channel.

In Figs. 3 and 4 I have shown a modified form of freeness tester which operates upon a principle quite similar to that employed in the ordinary washer. Instead of withdrawing the liquid which flows through the screens by means of a siphon, the interior of the rotating element is divided into as many separate pockets or compartments 63 as there are screened openings and each one of these compartments is provided with an approximately radial discharge pipe 64 through which the liquid flows from the compartments by gravity into the enlarged axial pipe 65 and from which it may be discharged into a tubular receptacle similar to that shown at 48.

Figure 6:
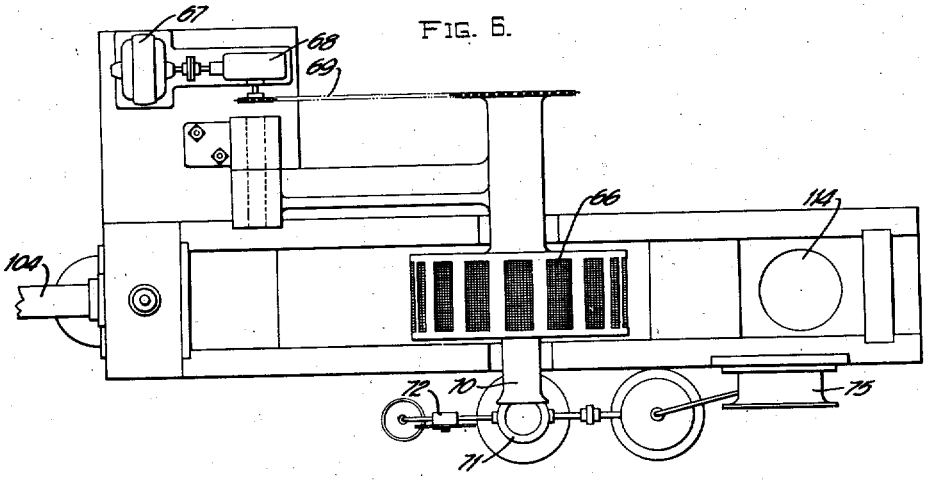
Fig. 6 is a plan view of Fig. 5.

In Figs. 5 and 6 I have shown a slight modification of my freeness indicator in which the rotating element 66, provided with screened peripheral openings therein, is driven by means of a motor 67 through an appropriate reduction gearing 68 by means of the chain 69. The interior of the element 66 may be provided with a plurality of separate pockets or compartments, one for each screen, with pipes discharging into the central hollow shaft 70 and from which the material is delivered into the vertical tubular element 71. The rate of flow of the material from the element 71 may be regulated by means of a valve 72 provided with a hand 73 and a graduated dial 74 indicating the degree of opening thereof. By properly adjusting the valve opening, the height of material for a given consistency may be maintained substantially constant in the element 71, and by graduating this tube and calibrating the same in known freeness, it is possible to read therefrom at any time the freeness of the material. As in the device shown in Fig. 2, a recording level gauge 74' actuated by the pressure of the material in the element 71 may be employed to make a record of variations in the level of material and hence a record of its freeness.

In Figs. 5 and 6, parts which are similar to those parts described in Figs. 1 and 2 are indicated by the same numbers as in Figs. 1 and 2 plus 100. That is to say, the discharge pipe in Fig. 1 is indicated as 14 and in Figs. 5 and 6 it is 114. It is to be understood that the device shown in Figs. 5 and 6 should be used in connection with some means for maintaining the density or consistency and the temperature of the material substantially constant; otherwise, it will be necessary to correct the indicated freeness for these two factors.

Figure 7:
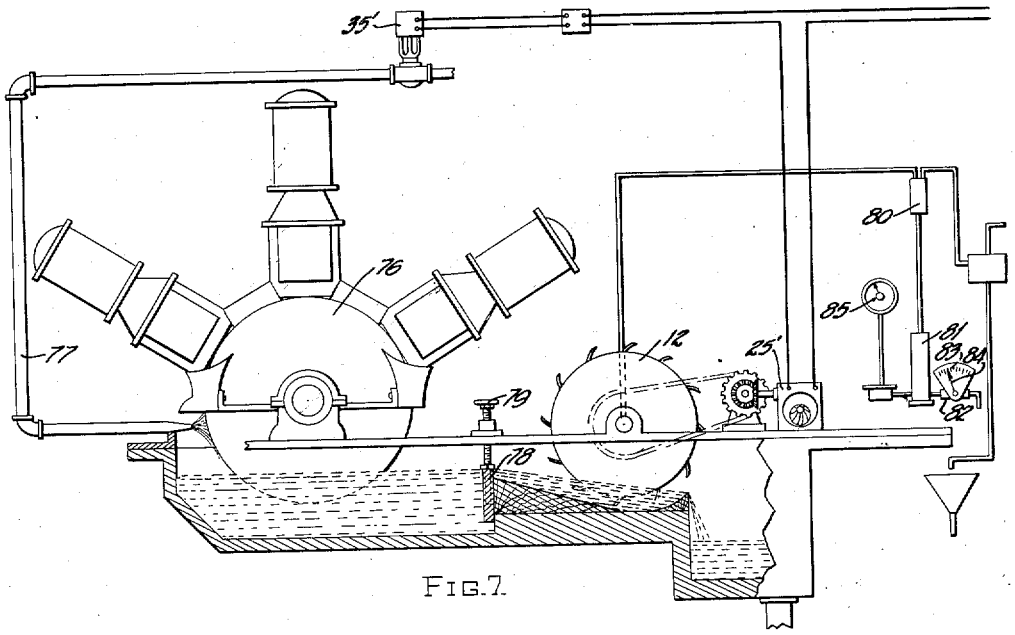
Fig. 7 is an elevation view showing the application of my freeness indicator to a pulp grinder.

In Fig. 7, I have shown the application of my freeness device to a pulp grinder. The pulp grinder is represented generally by 76 and the water is supplied thereto through the pipe 77. The ground pulp flows over the weir or dam 78 the height of which may be adjusted by means of a hand wheel 79. Rotatably mounted with its lower periphery submerged in the stream flowing over the weir 78 is the rotating element 12 in all respects similar to the element 12 shown in Figs. 1 and 2. This element drives the recording tachometer 25' provided with an electric switch in all respects similar to that described in connection with Fig. 1 and which controls a valve 35' admitting water to the grinder. The liquid passing through the screened apertures of the element 12 is withdrawn by means of the siphon apparatus, represented generally by 80 and is delivered into the receptacle 81. It is understood, of course, that a rotating element 12' may be substituted for element 12.

The rate of flow of the material out of the receptacle 81 can be regulated by means of a valve 82 provided with a dial 83 and a hand 84 indicating the extent of the opening of the valve. Variations in the height of the material in the receptacle 81 and hence the freeness thereof may be recorded by the recording level gauge 85.

Variations in the rate of speed at which the element 12 is driven by the outflowing stream of material effect corresponding variations in the position of the stylus of the tachometer 25'. When the consistency increases beyond a predetermined point the valve 35' is opened to admit more water to the grinder. This apparatus is in all respects similar to the apparatus for regulating the consistency described in detail in connection with Fig. 1.

Figure 9:
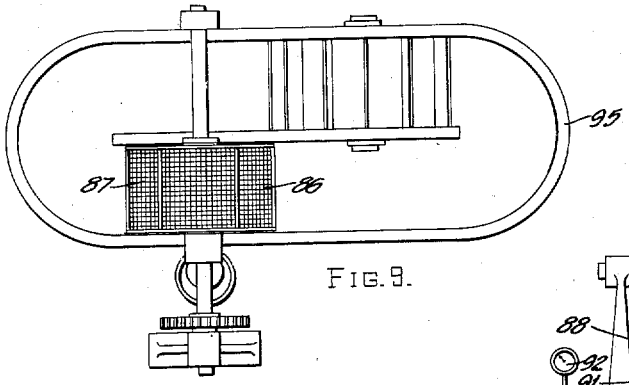
Fig. 9 is a plan view of Fig. 8.
Figure 8:
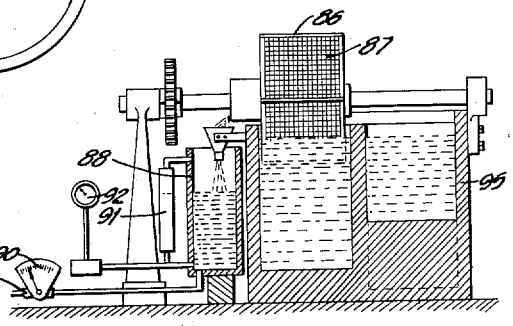
Fig. 8 is an end elevation view, partially in section of a beater, in the plane 8—8 of Fig. 10 showing how an ordinary washer may be utilized in determining the freeness of the stock.
Figure 10:
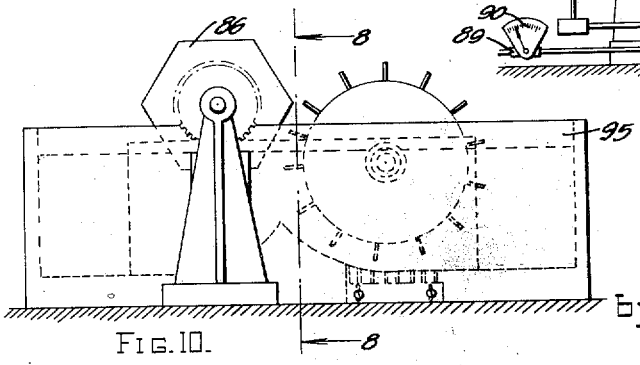
Fig. 10 is a side elevation view of Figs. 8 and 9.

In Figs. 8, 9, and 10 I have shown the use of an ordinary washer in connection with a beating engine for determining the freeness of the material. In these figures 95 represents the beater tub and 86 is the washer. The volume of material flowing through the washer screens 87 is proportional to the freeness of the stock and this liquid is delivered into the receptacle 88. The outflow of material from the receptacle 88 is controlled by means of a valve 89 provided with a dial 90 indicating the extent of the opening thereof and permitting settings to various degrees of openings. A transparent gauge 91, similar to a water gauge, may be associated with the receptacle 88 and which will provide an indication of the depth of the material therein. This gauge may, of course, be graduated in freeness and the freeness at any time read directly therefrom. A recording level gauge 92 may also be employed in connection with the receptacle 88 and the gauge 91 to make a permanent record of the variations in the level of water therein, thereby indicating variations in the freeness of the material.

I have shown my freeness indicator as used in connection with a number of pieces of apparatus used in the paper making art, and it is to be understood that it may be used generally with any apparatus where it is necessary or desirable to ascertain the freeness. It will also be understood that the drawings are merely illustrative and that changes within the purview of the appended claims may be made without departing from the true scope and spirit of my invention in its broader aspects.

What I claim is:

1. In a device of the character described, a drum having a foraminous periphery mounted to rotate in a vertical plane with its lower portion submerged in a flowing body of paper stock and provided with means adapting it to be driven by said stock as an undershot wheel; means responsive to variations in the rotative speed of said drum for regulating the consistency of the stock; and means for determining variations in the rate of flow of said liquid through the foramina in said drum.

2. In a device of the character described, a drum mounted to rotate with its lower periphery submerged in a flowing body of paper stock and provided with means adapting it to be driven by said stock as an undershot wheel; the periphery of said drum being divided into a plurality of separate compartments having screened openings communicating with the stock in said stream; means responsive to variations in the rotative speed of said drum for regulating the consistency of the stock; and means for determining variations in the rate of flow of said liquid into said compartments.

3. In a stock treating system of the character described, a foraminous element both sides of which are normally exposed to atmospheric pressure, means for exposing one side of said element to liquid pressure from said stock, and means continuously responsive to slight variations in the rate of flow of liquid through said element for indicating the current rate of flow therethrough.

4. A device for determining the rate of flow of water through a mat of paper stock which comprises an element having a screened opening therein, means for successively submerging the screened portion of said element in a body of said stock and withdrawing it therefrom while maintaining balanced atmospheric pressures on both sides of said screened opening whereby, when submerged, a filter mat of said stock will be temporarily formed over said screened opening and control the rate of flow of liquid therethrough, means for withdrawing and segregating liquid flowing through said opening during the periods of submergence, and means responsive to slight variations in the volume of liquid segregated during such successive periods of submergence for indicating the current rate of flow of liquid through said opening.

5. The method of determining the current freeness of paper stock undergoing preparation which comprises maintaining said stock at substantially uniform consistency, repeatedly establishing and momentarily maintaining filter mats of material from said stock, creating a flow of liquid from said stock through said mats while maintaining balanced atmospheric pressures on opposite sides thereof, segregating the liquid flowing through said mats in a suitable receptacle, and withdrawing liquid from said receptacle at a rate calculated to maintain the surface of the liquid therein at a fixed level intermediate the top and bottom of said receptacle when the freeness of said stock corresponds to a desired standard; whereby variations in the level of the liquid in said receptacle will indicate variations in the freeness of said stock, and the current level will indicate the current freeness.

6. The method of determining the current freeness of paper stock undergoing preparation which comprises maintaining said stock at substantially uniform temperature and consistency, repeatedly establishing and momentarily maintaining filter mats of material from said stock, creating a flow of liquid from said stock through said mats while maintaining balanced atmospheric pressures on opposite sides thereof, segregating the liquid flowing through said mats in a suitable receptacle, and withdrawing liquid from said receptacle at a rate calculated to maintain the surface of the liquid therein at a fixed level intermediate the top and bottom of said receptacle when the freeness of said stock corresponds to a desired standard; whereby variations in the level of the liquid in said receptacle will indicate variations in the freeness of said stock, and the current level will indicate the current freeness.

GEORGE S. WITHAM, JR.